US011629950B2

(12) United States Patent
Nakagawa et al.

(10) Patent No.: US 11,629,950 B2
(45) Date of Patent: Apr. 18, 2023

(54) DETECTION DEVICE, DETECTION SYSTEM, DETECTION METHOD, AND STORAGE MEDIUM

(71) Applicant: NIKON CORPORATION, Tokyo (JP)

(72) Inventors: Yoshihiro Nakagawa, Tokyo (JP); Takeaki Sugimura, Tokyo (JP); Yoshiyuki Yamariku, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 494 days.

(21) Appl. No.: 16/126,312

(22) Filed: Sep. 10, 2018

(65) Prior Publication Data
US 2019/0017812 A1  Jan. 17, 2019

Related U.S. Application Data

(63) Continuation of application No. PCT/JP2017/008166, filed on Mar. 1, 2017.

(30) Foreign Application Priority Data

Mar. 9, 2016 (JP) .............................. JP2016-046343

(51) Int. Cl.
G01B 11/24 (2006.01)
G06T 7/73 (2017.01)
(Continued)

(52) U.S. Cl.
CPC ............ G01B 11/24 (2013.01); G01B 11/245 (2013.01); G01B 11/2518 (2013.01); G06T 7/40 (2013.01);
(Continued)

(58) Field of Classification Search
CPC .. G06T 7/70; G06T 7/40; G06T 7/514; G06T 7/521; G06T 17/00; G06T 7/73;
(Continued)

(56) References Cited

U.S. PATENT DOCUMENTS 6,664,531 B2 * 12/2003 Gartner ................ G01B 11/245
250/559.4
6,876,762 B1    4/2005 Ono
(Continued)

FOREIGN PATENT DOCUMENTS

EP      1406233 A2 *  4/2004  ............. G03B 21/56
JP    H10-079029 A     3/1998
(Continued)

OTHER PUBLICATIONS

May 14, 2019 Office Action issued in Japanese Patent Application No. 2018-504412.
(Continued)

Primary Examiner — Seung C Sohn
(74) Attorney, Agent, or Firm — Oliff PLC

(57) ABSTRACT

A detection device includes: a detector that detects an object from a first viewpoint; an information calculator that calculates first model information including shape information on the object from the first viewpoint by using detection results of the detector; a light source calculator that calculates light source information on the light source by using a first taken image obtained by imaging a space including a light source that irradiates the object with illumination light and including the object; and a position calculator that calculates a positional relation between the first viewpoint and the object by using the light source information as information used to integrate the first model information and second model information including shape information obtained by detecting the object from a second viewpoint different from the first viewpoint.

19 Claims, 10 Drawing Sheets

(51) Int. Cl.
| | |
|---|---|
| H04N 5/247 | (2006.01) |
| G06T 7/40 | (2017.01) |
| H04N 5/232 | (2006.01) |
| G06T 7/521 | (2017.01) |
| G06T 17/00 | (2006.01) |
| G06T 7/514 | (2017.01) |
| G01B 11/25 | (2006.01) |
| G06T 7/70 | (2017.01) |
| G01B 11/245 | (2006.01) |
| G06T 7/55 | (2017.01) |
| H04N 5/225 | (2006.01) |

(52) U.S. Cl.
CPC .............. *G06T 7/514* (2017.01); *G06T 7/521* (2017.01); *G06T 7/55* (2017.01); *G06T 7/70* (2017.01); *G06T 7/73* (2017.01); *G06T 17/00* (2013.01); *H04N 5/23238* (2013.01); *H04N 5/247* (2013.01); *G06T 2207/10028* (2013.01); *H04N 5/2256* (2013.01)

(58) Field of Classification Search
CPC ..... G06T 7/55; G01B 11/245; G01B 11/2518; G01B 11/24; H04N 5/23238; H04N 5/247
USPC .................................................... 250/559.29
See application file for complete search history.

(56) References Cited

U.S. PATENT DOCUMENTS

| | | | | |
|---|---|---|---|---|
| 6,965,690 | B2* | 11/2005 | Matsumoto | G06T 17/10 |
| | | | | 345/420 |
| 9,218,116 | B2* | 12/2015 | Benko | G06F 3/0486 |
| 2005/0265583 | A1* | 12/2005 | Covell | G06K 9/00375 |
| | | | | 382/103 |
| 2008/0075324 | A1 | 3/2008 | Sato et al. | |
| 2009/0316965 | A1 | 12/2009 | Mailling et al. | |
| 2012/0039525 | A1* | 2/2012 | Tian | H04N 13/271 |
| | | | | 382/154 |
| 2012/0045149 | A1* | 2/2012 | Arai | H04N 7/183 |
| | | | | 382/296 |
| 2014/0028805 | A1* | 1/2014 | Tohme | G01B 11/2518 |
| | | | | 348/47 |
| 2014/0301632 | A1 | 10/2014 | Ikeda et al. | |
| 2015/0181191 | A1 | 6/2015 | Iwai et al. | |
| 2019/0108396 | A1* | 4/2019 | Dal Mutto | G06T 7/174 |

FOREIGN PATENT DOCUMENTS

| | | |
|---|---|---|
| JP | 2001-141423 A | 5/2001 |
| JP | 2006-030127 A | 2/2006 |
| JP | 2006-071434 A | 3/2006 |
| JP | 2010-134546 A | 6/2010 |
| JP | 2011-154038 A | 8/2011 |
| JP | 2012-242322 A | 12/2012 |
| JP | 2014-203365 A | 10/2014 |
| WO | 2013/187204 A1 | 12/2013 |

OTHER PUBLICATIONS

May 16, 2017 Search Report issued in International Patent Application No. PCT/JP2017/008166.

May 16, 2017 Written Opinion issued in International Patent Application No. PCT/JP2017/008166.

* cited by examiner

DETECTION DEVICE, DETECTION SYSTEM, DETECTION METHOD, AND STORAGE MEDIUM

CROSS REFERENCE TO RELATED APPLICATION

This is a Continuation of PCT Application No. PCT/JP2017/008166, filed on Mar. 1, 2017. The contents of the above-mentioned application are incorporated herein by reference.

FIELD OF THE INVENTION

The present invention relates to a detection device, a detection system, a detection method, and a storage medium.

BACKGROUND ART

A technique in which an object is detected by a plurality of imaging devices and a plurality of obtained images are input to a computer to acquire a three-dimensional shape of the object has been developed (see, for example, Patent Literature 1).

CITATION LIST

Patent Literature

[Patent Literature 1] Japanese Unexamined Patent Application Publication No. 2010-134546

In the technique as described above, it is desired to acquire relative positions between a plurality of detection devices.

SUMMARY

A first aspect of the present invention provides a detection device including: a detector that detects an object from a first viewpoint; an information calculator that calculates first model information including shape information on the object from the first viewpoint by using detection results of the detector; a light source calculator that calculates light source information on the light source by using a first taken image obtained by imaging a space including a light source that irradiates the object with illumination light and including the object; and a position calculator that calculates a positional relation between the first viewpoint and the object by using the light source information as information used to integrate the first model information and second model information including shape information obtained by detecting the object from a second viewpoint different from the first viewpoint.

A second aspect of the present invention provides a detection device including: a detector that detects an object from a first position; an information calculator that calculates first model information including shape information or texture information on the object from the first position by using detection results of the detector; and a position calculator that calculates a positional relation between the first position and the object based on an irradiation direction in which the object is irradiated with light from a light source.

A third aspect of the present invention provides a detection system including: a first detection device that is the detection device in the first aspect; a second detection device that detects the object from the second viewpoint to calculate second model information including shape information on the object, transmits second position information representing a relation between an irradiation direction of the illumination light and a position of the object and a position of the viewpoint, and transmits the second model information; and a model integrator that integrates the first model information and the second model information by using first position information representing a positional relation between the first viewpoint and the object calculated by the position calculator and using the second position information.

A fourth aspect of the present invention provides a detection method including: detecting an object from a first viewpoint; calculating first model information including shape information on the object from the first viewpoint by using detection results in the detecting; calculating, by using a first taken image obtained by imaging a space including a light source that irradiates the object with illumination light and including the object, light source information on the light source; and calculating a positional relation between the first viewpoint and the object by using the light source information as information used to integrate the first model information and second model information including shape information obtained by detecting the object from a second viewpoint different from the first viewpoint.

A fifth aspect of the present invention provides storage medium storing therein a detection program causing a computer to execute: calculating, by using detection results of detecting an object from a first viewpoint, first model information including shape information on the object from the first viewpoint; calculating, by using a first taken image obtained by imaging a space including a light source that irradiates the object with illumination light and including the object, light source information on the light source; and calculating a positional relation between the first viewpoint and the object by using the light source information as information used to integrate the first model information and second model information including shape information obtained by detecting the object from a second viewpoint different from the first viewpoint.

A sixth aspect of the present invention provides a detection system including: the detection device in the first aspect or the second aspect; and an information processing device that processes information output from the detection device.

DESCRIPTION OF EMBODIMENTS

First Embodiment

Figure 1:
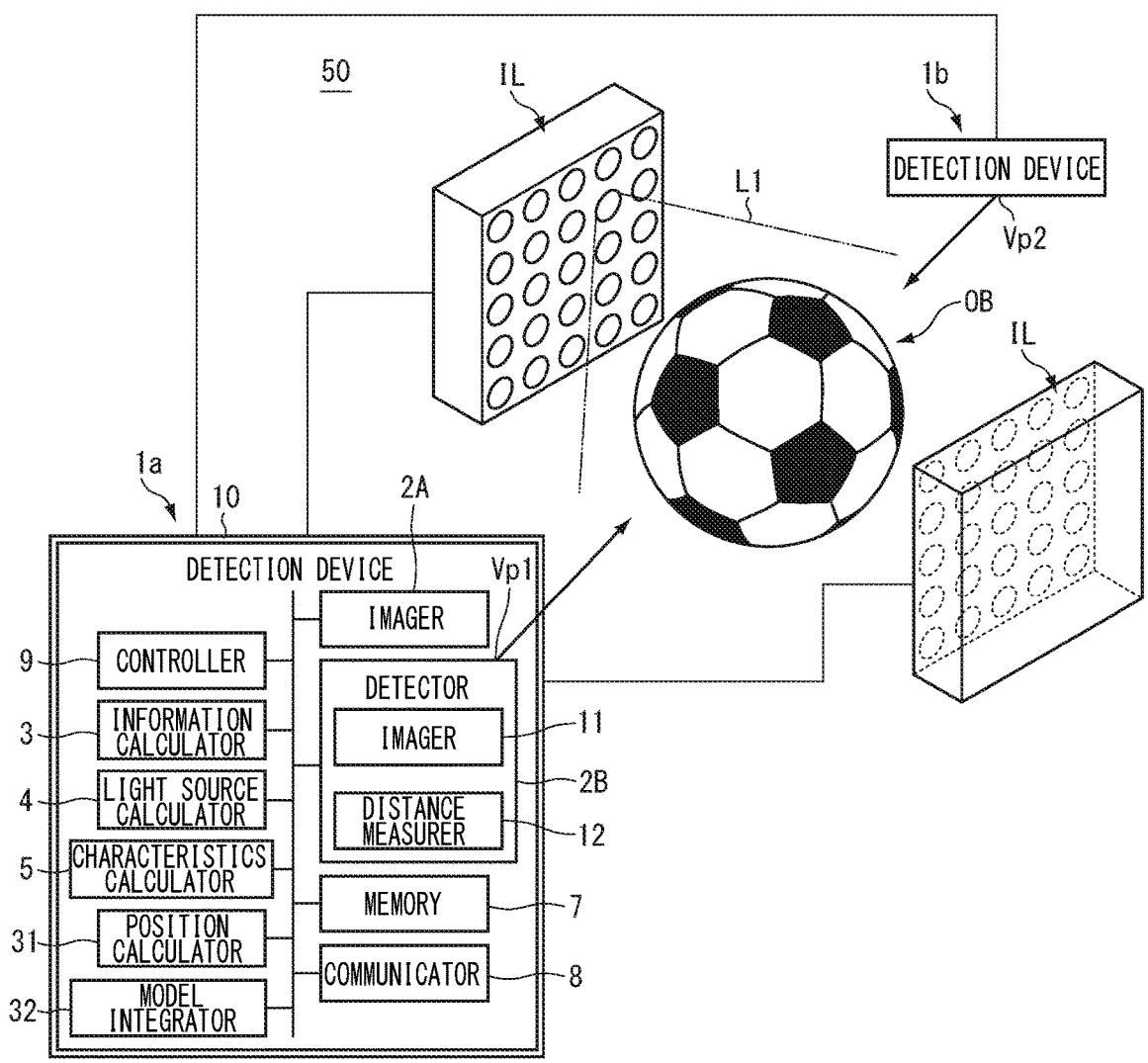
FIG. 1 is a diagram illustrating a detection device and a detection system according to a first embodiment.

A first embodiment is described. FIG. 1 is a diagram illustrating a detection device and a detection system according to the embodiment. A detection system 50 includes a plurality of detection devices (detection device 1a, detection device 1b) and an illumination device IL. The illumination device IL irradiate an object OB with illumination light L1. The object OB in the first embodiment is irradiated with the illumination light L1 controlled by the illumination device IL as well as, for example, environment light L2 such as light from interior light and natural light. The detection device 1a (first detection device) detects the object OB from a viewpoint Vp1 (first viewpoint), and calculates model information (first model information) on the object OB viewed from the viewpoint Vp1. The detection device 1b (second detection device) detects the object OB from a viewpoint Vp2 different from the viewpoint Vp1, and calculates model information (second model information) on the object OB viewed from the viewpoint Vp2. The detection system 50 integrates the first model information and the second model information.

For example, at least one of the detection device 1a and the detection device 1b is an imaging device, and detects an object OB in a detection region (for example, field of view). For example, at least one of the detection device 1a and the detection device 1b may be a fixed-point camera, a camera capable of manually or automatically changing the field of view, or a portable information terminal (for example, smartphone, tablet, and mobile phone with camera). The detection device 1a and the detection device 1b each use the result of detecting the object OB to perform arithmetic processing on information on the object OB. The detection device 1a and the detection device 1b each perform arithmetic processing on its own terminal to model at least a part of the object OB and calculate model information (model data). For example, the detection device 1a and the detection device 1b each execute computer graphics processing (CG processing) to calculate model information (for example, CG model data).

For example, the model information includes shape information representing a three-dimensional shape of the object OB. The model information may include texture information on the object OB. For example, the model information includes at least one of three-dimensional point coordinates, relevance information on the point coordinates, texture information on surfaces defined by the three-dimensional point coordinates and their relevance information, spatial information on images, such as illumination conditions and light source information in the entire image, and polygon data serving as shape information. For example, the texture information includes at least one information on a character, a figure, a pattern, information defining unevenness, a particular image, and color (for example, chromatic color, achromatic color) of the surface of the object OB. For example, the detection device 1a calculates model information representing the object OB viewed from a viewpoint Vp1 (for example, predetermined viewpoint, first viewpoint, single viewpoint, one direction). For example, the detection device 1a calculates model information representing the object OB viewed from first viewpoint at a predetermined angle from the object OB.

For example, the detection device 1a includes an imager 2A, a detector 2B, an information calculator 3, a light source calculator 4, a characteristics calculator 5, a position calculator 31, a model integrator 32, a memory 7, a communicator 8, a controller 9, and a main body 10. Examples of the main body 10 include a camera body, a case, and a casing. For example, the detector 2B, the information calculator 3, the light source calculator 4, the characteristics calculator 5, the position calculator 31, and the model integrator 32 are provided in the main body 10.

The imager 2A (first imager) images a space including a light source 19 (illustrated in FIGS. 3A and 3B referred to later) that irradiates an object OB with illumination light and including the object. For example, imaging results (first taken image) of the imager 2A include an omnidirectional image. For example, the imager 2A is an omnidirectional camera, and takes a 360° panorama image as an omnidirectional image. An omnidirectional image is an image that is looked over from the viewpoint of the imager 2A in the range of 360° for two declination directions (latitudinal direction and longitudinal direction) in polar coordinates whose pole is the viewpoint. For example, the imager 2A stores data on taken omnidirectional images (omnidirectional image data) in the memory 7. In the following description, the first taken image is an omnidirectional image, but the first taken image may be a part of an omnidirectional image, and, for example, may be an image taken in the range of a hemisphere corresponding to a half of a sphere centered at the viewpoint of the imager 2A, or an image taken in a range equal to or larger than the hemisphere and smaller than 360°. The first taken image is not necessarily required to be an omnidirectional image, and is not necessarily required to be a part of an omnidirectional image. The imager 2A may be provided in the main body 10, and may be provided separately from the main body 10. The detection device 1a is not necessarily required to include the imager 2A, and, for example, may be an imaging device different from the detection device 1a in the detection system 50.

Figure 2:
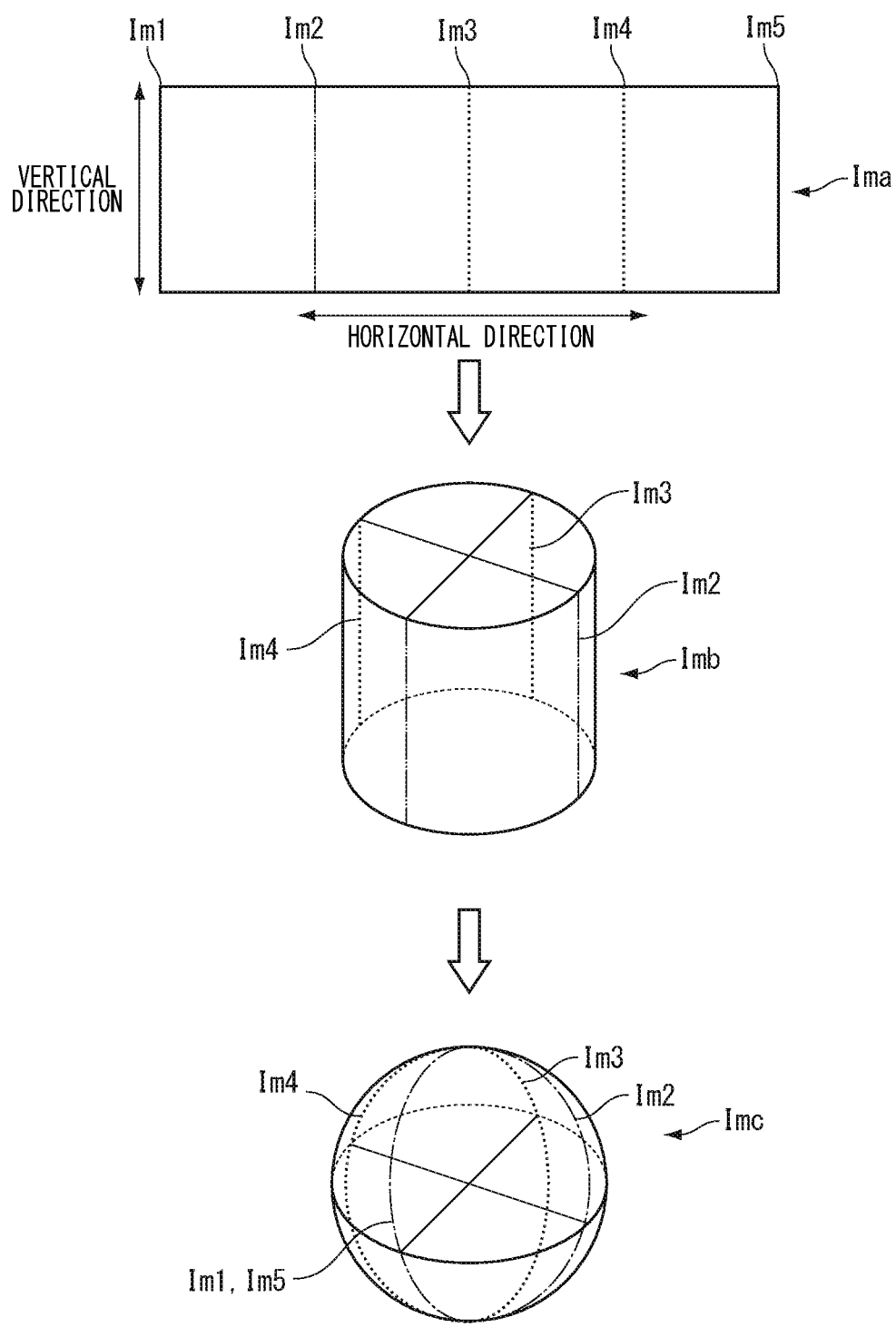
FIG. 2 is a diagram illustrating a first taken image according to the first embodiment.

FIG. 2 is a conceptual diagram illustrating an omnidirectional image. For example, an omnidirectional image Ima is an image obtained by imaging the periphery of an object in the horizontal direction in a range of 360°. For example, the omnidirectional image Ima is an image obtained by imaging a sphere from a viewpoint of the imager 2A in all directions (in the range of 360° in the longitudinal direction and the latitudinal direction). Symbols Im1 to Im5 in FIG. 2 respectively represent angular positions of 0°, 90°, 180°, 270°, and 360° of the periphery of the object. An omnidirectional image Imb is an image obtained by projecting the omnidirectional image Ima onto a cylindrical surface such that the angular position Im1 of 0° and the angular position Im5 of 360° in the omnidirectional image Ima match with each other. An omnidirectional image Imc is an image obtained by projecting the omnidirectional image Imb onto a spherical surface such that upper ends of the angular positions Im1 to Im4 in the vertical direction in the omnidirectional image Imb match with one another and lower ends of the angular positions Im1 to Im4 in the vertical direction in the omnidirectional image Imb match with one another.

Referring back to the description with reference to FIG. 1, for example, the detector 2B optically detects the object OB from the viewpoint Vp1. For example, the detector 2B acquires at least one of an image of the object OB viewed from the viewpoint Vp1 and a distance from the viewpoint Vp1 to each point on the object OB. For example, the detector 2B may detect the object OB from a predetermined angle of sight. For example, the detector 2B may detect the object OB from a predetermined line of sight (for example, single line of sight).

Figure 3A:
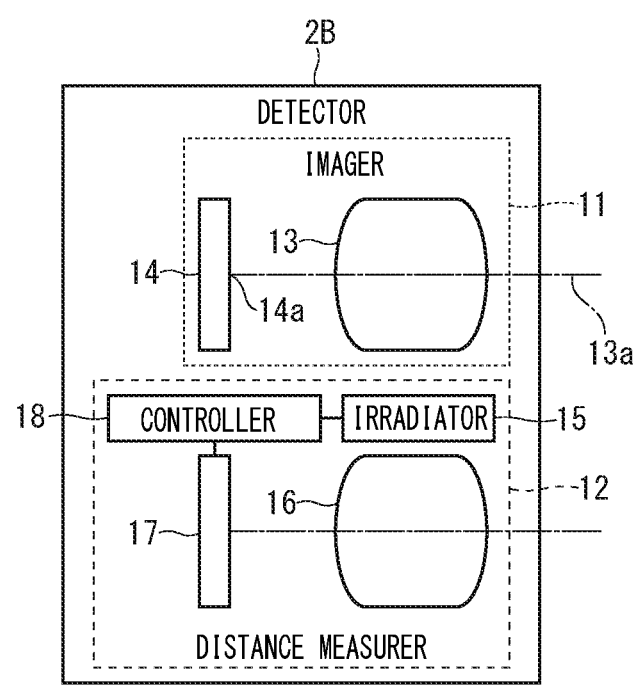
FIGS. 3A to 3C includes diagrams illustrating a detector and an illumination device according to the first embodiment.

FIG. 3A is a diagram illustrating an example of the detector 2B. For example, the detector 2B includes an imager 11 (second imager) and a distance measurer 12. The imager 11 images an object OB from a viewpoint Vp1, and outputs data on an image (second taken image) of the object OB as a detection result. For example, the imaging range (for example, field of view, angle of view) of the imager 2A (first imager) is wider than the imaging range (for example, field of view, angle of view) of the imager 11 (second imager). For example, the detection results of the detector 2B include image data on the detected object OB. The distance measurer 12 detects a distance from the viewpoint Vp1 (see FIG. 1) to each point on the object OB. The detector 2B is not necessarily required to include the imager 11 or the distance measurer 12. For example, the detection system 50 may use the imager 2A instead of the imager 11. The imager 11 may image a space including a light source that irradiates the object OB with illumination light and including the object OB. In this case, the detection system 50 may use an imaging result of the imager 11 as a first taken image, and, for example, is not necessarily required to include the imager 2A.

The imager 11 includes an image forming optical system 13 and an imaging element 14. The image forming optical system 13 forms an image of the object OB. For example, the image forming optical system 13 is held in a lens barrel and mounted to the main body 10 (see FIG. 1) together with the lens barrel. Examples of the image forming optical system 13 and the lens barrel include an interchangeable lens, which is detachable from the main body 10. The image forming optical system 13 and the lens barrel may be a built-in lens, and, for example, the lens barrel may be a part of the main body 10 and may be undetachable from the main body 10.

For example, the imaging element 14 is a CMOS image sensor or a CCD image sensor in which a plurality of pixels are two-dimensionally arranged. For example, the imaging element 14 is housed in the main body 10. The imaging element 14 takes an image formed by the image forming optical system 13. For example, imaging results (detection results) of the imaging element 14 include information (for example, RGB data) on grayscale values of colors of pixels. For example, the imaging element 14 outputs the imaging results in a data format of a full-color image. The imager 11 may detect the direction and the intensity of light beams from the object OB like a light-field camera, for example.

The distance measurer 12 detects a distance from each point on the surface of the object OB. For example, the distance measurer 12 detects the distance by a time of flight (TOF) method. The distance measurer 12 may detect the distance by another method. For example, the distance measurer 12 may include a laser scanner and detect the distance by laser scanning. For example, the distance measurer 12 may project a predetermined pattern to the object OB and measure the distance based on a result of detecting the pattern. The distance measurer 12 may include a phase difference sensor and detect the distance by the phase difference method. The distance measurer 12 may detect the distance by a depth from defocus (DFD) method. In the case where a method using imaging such as the DFD method is used, the distance measurer 12 may use at least one of the image forming optical system 13 and the imaging element 14 in the imager 11.

For example, the distance measurer 12 includes an irradiator 15, an image forming optical system 16, an imaging element 17, and a controller 18. The irradiator 15 is able to irradiate the object OB with infrared light. The irradiator 15 is controlled by the controller 18. The controller 18 temporally changes (for example, amplitude modulates) the intensity of infrared light applied from the irradiator 15. The image forming optical system 16 forms an image of the object OB. The image forming optical system 16 may, similarly to the image forming optical system 13, be at least a part of interchangeable lenses or at least a part of built-in lenses. The imaging element 17 is, for example, a CMOS image sensor or a CCD image sensor. The imaging element 17 has sensitivity to at least a wavelength band of light applied by the irradiator 15. The imaging element 17 is, for example, controlled by the controller 18 to detect infrared light reflected and scattered by the object OB. For example, the imaging element 17 takes the image formed by the image forming optical system 16.

The controller 18 uses the detection results of the imaging element 17 to detect distances (depths) from points on the surface of the object OB to the imaging element 17. For example, flying time of light entering the imaging element 17 from a point on the surface of the object OB changes depending on the depth of the point. The output of the imaging element 17 changes depending on the flying time, and, for example, the controller 18 calculates the depth based on the output of the imaging element 17. For example, the controller 18 calculates the depth for each partial region (for example, one pixel, a plurality of pixels) of an image taken by the imaging element 17, and calculates (generates) depth information by associating the position and the depth in the region. For example, the depth information includes information in which the position of a point on the surface of the object OB and the distance (depth) from the point to the imaging device 1a (for example, the distance measurer 12) are associated with each other. For example, the depth information includes information (for example, a depth image) representing a distribution of depths (for example, depth map) in the object OB.

Figure 3B:
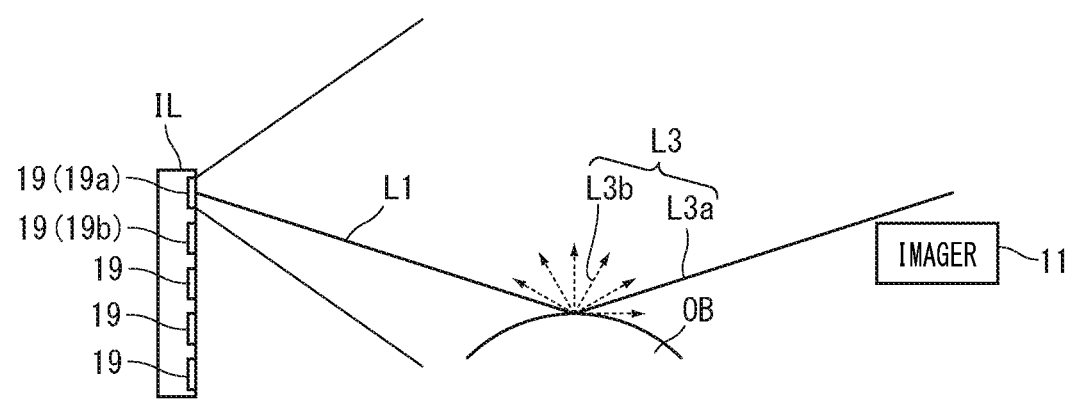
Figure 3C:
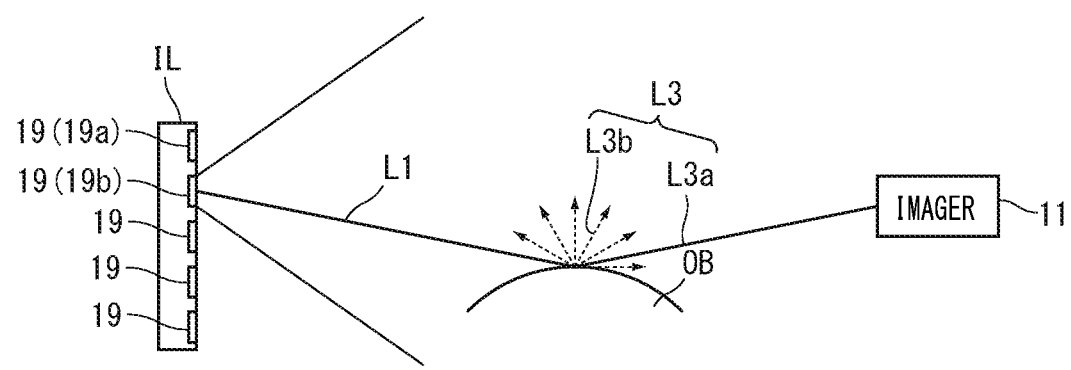

Next, FIG. 3B and FIG. 3C are diagrams illustrating the illumination device IL. The illumination device IL irradiates a space including an object OB with illumination light L1. The illumination device IL is able to change an irradiation direction of the illumination light L1 with respect to the object OB. For example, the illumination device IL includes a plurality of light sources 19 like an LED matrix, and changes the irradiation direction by switching a light source to be turned on among the light sources 19. For example, in FIG. 3B, in the illumination device IL, a light source 19a among the light sources 19 is turned on, and the other light sources are turned off. In FIG. 3C, in the illumination device IL, a light source 19b among the light sources 19 is turned on, and the other light sources are turned off. For example, the illumination device IL is able to control the turning-on and the turning-off of the illumination light L1 irradiating the object OB, the irradiation direction, and illuminance.

For example, the illumination device IL is connected to the controller 9 (see FIG. 1) in the detection device 1a so as to be communicable in a wired or wireless manner. For example, the controller 9 supplies a control signal to the illumination device IL, and, for example, the illumination device IL switches the turning-on and the turning-off of each of the light sources 19 based on the control signal from the controller 9. For example, the controller 9 controls the imager 2A and the imager 11 in the detector 2B to take images in synchronization with the irradiation of the illumination light L1. For example, the controller 9 stores taken image data from the imager 2A and the imager 11 in the memory 7 in association with irradiation conditions of the illumination device IL. For example, the irradiation conditions of the illumination device IL include the irradiation direction of the illumination light L1 (for example, identification information on the turned-on light source). For example, the controller 9 controls the imager 2A and the imager 11 to take images of the object OB in the state in which the object OB is not irradiated with the illumination light L1 from the illumination device IL, and stores taken image data in the memory 7. The controller 9 controls the imager 2A and the imager 11 to take images of the object OB in the state in which the object OB is irradiated with the illumination light L1 from the illumination device IL, and stores taken image data in the memory 7 in association with identification information on light sources that irradiate the object OB with the illumination light L1. The illumination device IL may change the irradiation direction of the illumination light L1 by changing at least one of the position and the posture of the illumination device IL.

For example, the illumination light L1 that irradiates the object OB is reflected in part and emitted from the object OB. For example, the ratio between the light amount of reflected light L3 and the illumination light L1 changes depending on optical characteristics (such as reflectivity, scattering rate, absorbance, and transmissivity) of the object surface. For example, the reflected light L3 includes a regularly reflected component L3$a$ and a scattered component L3$b$. For example, a light intensity distribution of the scattered component L3$b$ is represented by a Gaussian distribution centered at the normal direction of the object surface at an incident position of the illumination light L1 on the object (for example, the object OB). For example, the regularly reflected component L3$a$ has a distribution in which the light intensity becomes maximum in a direction in which the regularly reflected component L3$a$ is regularly reflected at the incident position on the object with respect to the irradiation direction of the illumination light L1, and the angular variance is smaller than in the scattered component L3$b$ (for example, the half-value width is smaller).

For example, the intensity of the reflected light L3 toward each direction (angular direction) around the incident position on the object changes depending on the ratio between the scattered component L3$b$ and the regularly reflected component L3$a$. For example, the ratio of the scattered component L3$b$ to the reflected light L3 changes depending on optical characteristics (for example, scattering rate, scattering coefficient) of the object surface. For example, the ratio of the scattered component L3$b$ to the reflected light L3 is high when the object surface is rough (degree of roughness is high), and is low when the object surface is close to a smooth surface (for example, mirror surface). For example, the brightness of the object surface in an image taken by the imager 11 changes depending on the irradiation direction of the illumination light L1. For example, in FIG. 3B, the regularly reflected component L3$a$ does not enter the imager 11, but a part of the scattered component L3$b$ enters the imager 11. In FIG. 3C, the regularly reflected component L3$a$ and a part of the scattered component L3$b$ enter the imager 11. For example, in an image taken by the imager 11, the brightness of a part corresponding to the incident position of the illumination light L1 in the object is higher in FIG. 3C than in FIG. 3B.

Referring back to the description with reference to FIG. 1, for example, the information calculator 3 includes a digital signal processor (DSP). The information calculator 3 uses detection results (for example, depth information) of the detector 2B to calculate at least one of shape information and texture information on the object OB. In the description with reference to FIG. 3A, the distance measurer 12 generates the depth information, but the information calculator 3 may generate depth information based on the depth detected by the distance measurer 12.

For example, the information calculator 3 calculates, as shape information, point cloud data including coordinates of a plurality of points on the object OB based on the detection results of the detector 2B. The information calculator 3 calculate point cloud data (point cloud data processing) by using the detection results of the distance measurer 12 (for example, depth information). For example, the information calculator 3 calculates point cloud data by perspective transformation from a distance image (depth image) represented by the depth information to a planar image. For example, the information calculator 3 stores the calculated point cloud data in the memory 7. When the imager 11 and the distance measurer 12 have different fields of view, for example, the information calculator 3 may convert the detection results of the distance measurer 12 into the result of detecting the object OB from the field of view of the imager 11 by perspective transformation (projection transformation) or the like. For example, the information calculator 3 may execute perspective transformation by using parameters that depend on the positional relation between the field of view of the imager 11 and the field of view of the distance measurer 12 (for example, position of viewpoint, direction of line of sight).

The information calculator 3 generates, as shape information, surface information including coordinates of a plurality of points on the object OB and connection information among the points based on the detection results of the detector 2B. Examples of the surface information include polygon data, vector data, and draw data. For example, the connection information includes information that associates points of both ends of a line corresponding to a ridge (for example, edge) of the object OB and information that associates a plurality of lines corresponding to the contour of a surface of the object OB with one another. For example, the information calculator 3 estimates a surface between a point selected from among a plurality of points included in the point cloud data and a neighborhood point, and converts the point cloud data into polygon data having planar information among the points (surface processing). For example, the information calculator 3 converts the point cloud data into the polygon data by an algorithm using the least squares method. For example, an algorithm published in a point cloud processing library may be applied to this algorithm. For example, the information calculator 3 stores the calculated surface information in the memory 7.

The light source calculator 4 uses the first taken image (for example, omnidirectional image) obtained by imaging a space including the light source 19 that irradiates an object OB with illumination light L1 and including the object OB, and calculates and estimates light source information on a light source 19 that irradiates the object OB with the illumination light. For example, the light source information includes information on at least one item of the position of a light source that irradiates the object OB with illumination light L1 with reference to the object, the direction in which the light source irradiates the object with light (irradiation direction), the wavelength of light emitted from the light source, and the type of the light source. For example, the light source calculator 4 estimates the relative position of a light source (for example, the light source 19 in FIGS. 3B and 3C) that irradiates the object OB with illumination light L1 with respect to the object. For example, the light source calculator 4 detects a light source 19 in the illumination device IL that appears in the omnidirectional image. For example, the light source calculator 4 uses an omnidirectional image projected on a spherical surface centered at the viewpoint of the imager 2A to detect the orientation of the light source 19 with respect to the viewpoint of the imager 2A. For example, the light source calculator 4 uses the orientation of the light source 19 with respect to the viewpoint of the imager 2A and position information on the viewpoint of the imager 2A to calculate position information on the light source 19. For example, the position information on the viewpoint of the imager 2A is determined by the arrangement of the imager 2A and is information known in advance.

For example, the light source calculator 4 may calculate the light source information by using a model that assumes Lambertian reflectance or a model including Albedo estimation. For example, the light source calculator 4 may use pixel values of respective pixels in an image taken by the imager 11 to estimate the scattered component L3b (refer to FIGS. 3B and 3C) derived from the object OB and the regularly reflected component L3a (refer to FIGS. 3B and 3C) derived from the object OB. For example, the light source calculator 4 may use the result of estimating the component regularly reflected by the object OB and shape information to calculate the direction in which light enters the object OB from the light source.

For example, the light source calculator 4 separates the illumination light L1 and the environment light L2 to calculate light source information on the illumination light L1. For example, the light source calculator 4 calculates the light source information by comparing and computing an omnidirectional image in the state in which the object OB is irradiated with the illumination light L1 and an omnidirectional image in which the object OB is not irradiated with the illumination light L1. For example, the light source calculator 4 takes a difference between an omnidirectional image in which the irradiation of the illumination light L1 is stopped and an omnidirectional image in the state in which the object OB is irradiated with the illumination light L1, thereby extracting influence of the illumination light L1 on the object OB (eliminating influence of the environment light L2). In this case, for example, the detection device 1a is not necessarily required to detect the object OB in a dark room, and is able to easily acquire the light source information. For example, the light source calculator 4 stores the calculated light source information in the memory 7.

The light source calculator 4 may generate an image in which the influence of illumination light L1 is reduced from a plurality of omnidirectional images. For example, the light source calculator 4 stores data on an image in which the influence of illumination light L1 is reduced from omnidirectional images in the memory 7. The communicator 8 may transmit at least one of an omnidirectional image in the state in which the object OB is not irradiated with the illumination light L1 and an image in which the influence of the illumination light L1 is reduced from the omnidirectional image to the outside. For example, such an image is global illumination information (scene information) including information on the periphery of the object OB, and is useable for the background when a modeled object OB is rendered.

The characteristics calculator 5 calculates surface characteristics information on the object OB. For example, the surface characteristics information includes optical characteristics for each part of the object OB, and the optical characteristics include at least one of reflectivity, transmissivity, scattering rate, and absorbance. For example, the surface characteristics information is a part of texture information, and, for example, the texture information includes information on at least one item of pattern information representing design of the surface of the object OB, light source information on the illumination light L1 illuminating the object OB, and surface characteristics information representing optical characteristics of the surface of the object OB.

For example, the characteristics calculator 5 calculates, as the surface characteristics information, at least one of bi-directional reflectance distribution function (BRDF) and spatially varying bidirectional reflectance distribution function (SVBRDF). The characteristics calculator 5 calculates the surface characteristics information by using light source information, shape information, and taken images obtained by imaging the object OB while changing the irradiation direction of the illumination light L1. The characteristics calculator 5 calculates, for each part of the object OB, surface characteristics information by using a shape represented by shape information (for example, the normal direction of the surface of each part of the object OB), the irradiation direction of the illumination light L1 represented by light source information, and a taken image corresponding to the irradiation direction of the illumination light L1. For example, the characteristics calculator 5 uses calculation results of the light source calculator 4 (for example, the irradiation direction of the illumination light L1) as light source information on the illumination light L1. For example, the characteristics calculator 5 uses calculation results of the information calculator 3 as shape information. For example, the characteristics calculator 5 uses imaging results of the imager 11 as taken images obtained by imaging the object OB while changing the irradiation direction of the illumination light L1. In the case where the imager 11 detects the direction of light beams (the irradiation direction of the illumination light L1) and the intensity thereof like a light-field camera, as compared with the case where the imaging is performed for each irradiation direction while changing the irradiation direction of the illumination light L1 in a plurality of directions, equivalent information is able to be acquired by single imaging. In this case, for example, as compared with the case where a plurality of images are taken, the influence of relative misalignment of the illumination device IL, the object OB, and the viewpoint Vp1 is able to be reduced during the imaging. The characteristics calculator 5 may use imaging results (for example, omnidirectional image) of the imager 2A as taken images obtained by imaging the object OB while changing the irradiation direction of the illumination light L1. For example, the characteristics calculator 5 calculates the surface characteristics information by using a taken image corresponding to the irradiation direction of the illumination light L1.

For example, the characteristics calculator 5 calculates the surface characteristics information by inverse rendering. For example, the characteristics calculator 5 solves a relational expression of optical characteristics, shape information, and light source information by defining optical characteristics of each part of the object OB to be unknown, thereby calculating the surface characteristics information. For example, the characteristics calculator 5 calculates the surface characteristics information by solving a relational expression established from the basic formula of inverse rendering by defining the SVBRDF to be unknown. A BDRF vector of known material is represented by $\rho j$ with tilde indicated in Expression (1) below. j is an index representing the kind of material, and m is the number of kinds of materials. For example, when optical characteristics of each of RGB are defined such that a declination of the viewpoint Vp in the latitudinal direction, a declination of the light source in the latitudinal direction, and a declination between the viewpoint Vp and the light source in the longitudinal direction in the polar coordinates whose pole is the object are in 90 steps (for example, in increments of 1°), the above-mentioned BRDF vector is a 90×90×90×3 dimensional vector.

[Math. 1]

$$\{\tilde{\rho}_j | j=1,2,\ldots,m\} \quad (1)$$

A basis vector Ki of m BRDF vectors above is determined by, for example, principal component analysis (PCA) as a vector to minimize Expression (2) below.

[Math. 2]

$$E = \sum_{j=1}^{m} \left\| \tilde{\rho}_j - \sum_{i=1}^{n} K_i^T \tilde{\rho}_j K_i \right\|^2 \quad (2)$$

Examples of the method for acquiring information on a part of an object OB for which surface characteristics information is to be calculated (hereinafter referred to as "part to be calculated") include a method in which a plurality of images taken for each irradiation direction while changing the irradiation direction of a light source (for example, the illumination light L1) are used to acquire pixel data (observation pixel data) from the same pixel corresponding to a part to be calculated. Another method is, for example, a method in which an image taken with one irradiation direction is used to acquire a plurality of pieces of pixel data (observation pixel data) from a pixel corresponding to a part of the object OB whose optical characteristics (surface characteristics) are regarded as the same as a part to be calculated and a pixel corresponding to the part to be calculated. A method in which the above-mentioned two methods are combined may be used. Regarding each part of the object OB corresponding to a region (for example, one pixel, a plurality of pixels) in the taken image, for example, the positional relation with the light source (for example, irradiation direction) is already known by the light source information, the normal direction at each part of the object OB is already known by the shape information, and the positional relation between each part of the object OB and the viewpoint Vp1 is already known by the shape information. Expression (3) below is observation pixel data on the same reflection characteristics. For example, Expression (3) is determined by correcting, for each part of the object OB viewed from the viewpoint Vp1, cosine components of distances between parts of the object OB and the viewpoint Vp1 with respect to the normal direction and cosine components of distances between parts of the object OB and the light source with respect to the normal direction.

[Math. 3]

$$\begin{bmatrix} x_{R1}(\theta_{h1},\theta_{d1},\varphi_{d1}) & x_{G1}(\theta_{h1},\theta_{d1},\varphi_{d1}) & x_{B1}(\theta_{h1},\theta_{d1},\varphi_{d1}) \\ x_{R2}(\theta_{h2},\theta_{d2},\varphi_{d2}) & x_{G2}(\theta_{h2},\theta_{d2},\varphi_{d2}) & x_{B21}(\theta_{h2},\theta_{d2},\varphi_{d2}) \\ \vdots & \vdots & \vdots \\ x_{Rm}(\theta_{hm},\theta_{dm},\varphi_{dm}) & x_{Gm}(\theta_{hm},\theta_{dm},\varphi_{dm}) & x_{Bm}(\theta_{hm},\theta_{dm},\varphi_{dm}) \end{bmatrix} \quad (3)$$

Expression (4) below is an expression used to calculate surface characteristics information. The left side of Expression (4) corresponds to observation pixel data in Expression (3). A matrix in the right side of Expression (4) is obtained by arranging basis vectors Ki indicated in Expression (2) in the row direction as column vectors. In Expression (4), when the number of observation pixels (the number of elements of vectors in the left side) is equal to or larger than the number of basis vectors (the number of columns in the matrix in the right side), a vector of a coefficient Wn is determined. For example, the vector of the coefficient Wn may be calculated by a method using optimization such as the method of least squares. Once the vector of the coefficient Wn is determined, the BDRF for any angle is able to be calculated by using the basis vector Ki.

[Math. 4]

$$\begin{bmatrix} x_{R1}(\theta_{h1},\theta_{d1},\varphi_{d1}) \\ x_{G1}(\theta_{h1},\theta_{d1},\varphi_{d1}) \\ x_{B1}(\theta_{h1},\theta_{d1},\varphi_{d1}) \\ x_{R2}(\theta_{h2},\theta_{d2},\varphi_{d2}) \\ x_{G2}(\theta_{h2},\theta_{d2},\varphi_{d2}) \\ x_{B21}(\theta_{h2},\theta_{d2},\varphi_{d2}) \\ \vdots \\ x_{Rm}(\theta_{hm},\theta_{dm},\varphi_{dm}) \\ x_{Gm}(\theta_{hm},\theta_{dm},\varphi_{dm}) \\ x_{Bm}(\theta_{hm},\theta_{dm},\varphi_{dm}) \end{bmatrix} = \quad (4)$$

$$\begin{bmatrix} K_{R11}(\theta h_1,\theta d_1,\varphi d_1) & \cdots & K_{R1n}(\theta h_1,\theta d_1,\varphi d_1) \\ K_{G11}(\theta h_1,\theta d_1,\varphi d_1) & \cdots & K_{G1n}(\theta h_1,\theta d_1,\varphi d_1) \\ K_{B11}(\theta h_1,\theta d_1,\varphi d_1) & & K_{B1n}(\theta h_1,\theta d_1,\varphi d_1) \\ \vdots & \ddots & \vdots \\ K_{Rm1}(\theta h_m,\theta d_m,\varphi d_m) & & K_{Rmn}(\theta h_m,\theta d_m,\varphi d_m) \\ K_{Gm1}(\theta h_m,\theta d_m,\varphi d_m) & \cdots & K_{Gmn}(\theta h_m,\theta d_m,\varphi d_m) \\ K_{Bm1}(\theta h_m,\theta d_m,\varphi d_m) & & K_{Bmn}(\theta h_m,\theta d_m,\varphi d_m) \end{bmatrix} \begin{bmatrix} W_1 \\ W_2 \\ \vdots \\ W_n \end{bmatrix}$$

In this manner, for example, the characteristics calculator 5 calculates surface characteristics information by solving the relational expression (for example, Expression (4)) of optical characteristics, shape information, and light source information while optical characteristics for each part of the object OB are unknown. For example, the characteristics calculator 5 stores the calculated surface characteristics information in the memory 7. For example, the characteristics calculator 5 calculates the surface characteristics information by solving the relational expression for a first part of the object OB. For example, the first part is a part for which information (for example, observation pixel) necessary for solving the relational expression is sufficient. For example, the characteristics calculator 5 does not calculate surface characteristics information by the relational expression for a second part different from the first part of the object OB. For example, the second part is a part for which information (for example, the number of observation pixels) necessary for solving the relational expression is insufficient. The characteristics calculator 5 may calculate optical characteristics of the second part by interpolation using optical characteristics of the first part. When information (for example, observation pixels) necessary for solving the relational expression is able to be obtained, the characteristics calculator 5 may calculate the irradiation direction of the illumination light L1 from surface characteristics information (for example, a plurality of pieces of surface characteristics information having different imaging viewpoints). The detection device 1 is not necessarily required to calculate the surface characteristics information on the object OB, and is not necessarily required to include the characteristics calculator 5.

The position calculator 31 uses the light source information to calculate and estimate first position information representing a positional relation between the object OB and the viewpoint Vp1. The first position information is used to integrate first model information and second model information including shape information obtained by detecting the object OB from a viewpoint Vp2 (second viewpoint). For example, the position calculator 31 calculates the positional relation between the first viewpoint (viewpoint Vp) and the object OB by using an irradiation direction of the illumination light L1 with respect to the object OB as the light source information. For example, a positional relation between the viewpoint of the imager 2A (for example, first taken image) and the viewpoint of the detector 2B is known in advance, and the orientation of the light source from the viewpoint of the imager 2A is able to be known from the light source information, and hence the position calculator 31 is able to estimate the position of the light source 19 with respect to the viewpoint (viewpoint Vp) of the detector 2B. For example, the information calculator 3 calculates the positional relation between the first viewpoint (viewpoint Vp) and the object OB, and the position calculator 31 is also able to estimate a positional relation among the viewpoint Vp, the object OB, and the light source 19 by using the positional relation between the first viewpoint (viewpoint Vp) and the object OB calculated by the information calculator 3 and the positional relation between the viewpoint Vp and the light source 19. The position calculator 31 may calculate the above-mentioned positional relation by using a plurality of pieces of light source information obtained from a plurality of first taken images (for example, omnidirectional images) having different irradiation directions of the illumination light L1. The first taken image used by the position calculator 31 may be a single taken image that has one type of the irradiation direction of the illumination light L1, and, for example, the irradiation direction of the illumination light L1 may be one direction. The imager 2A may acquire a taken image (for example, omnidirectional image) including an object OB and a detection device (for example, the detection device 1*a*), and the position calculator 31 may calculate the above-mentioned positional relation by using information obtained from the taken image. The imager 2A may acquire a taken image (for example, omnidirectional image) including a light source 19 and a viewpoint Vp (for example, the detection device 1*a*), and the position calculator 31 may calculate the above-mentioned positional relation by using information obtained from the taken image. For example, the detection device 1*b* has the same configuration as that of the detection device 1*a*. Similarly to the detection device 1*a*, the detection device 1*b* calculates second position information representing a positional relation between an object OB and a viewpoint Vp2. A communicator A in the detection device 1*a* receives second model information and second position information from the detection device 1*b*. The position calculator 31 may use light source information to calculate a positional relation between the illumination device IL (light source 19) and the viewpoint Vp1. The detection device 1*b* may use light source information to calculate a positional relation between the illumination device IL (light source 19) and the viewpoint Vp2. In this case, for example, the model integrator 32 may calculate a positional relation between the viewpoint Vp1 and the viewpoint Vp2 based on positional relations of the viewpoint Vp1 and the viewpoint Vp2 with respect to the illumination device IL (light source 19). The model integrator 32 may use the calculated positional relation between the viewpoint Vp1 and the viewpoint Vp2 to integrate first model information and second model information.

The model integrator 32 uses the first position information and the second position information to integrate the first model information and the second model information. For example, the model integrator 32 converts the coordinate system of the second model information into the same coordinate system as that of the first model information such that the relation between the object OB and a predetermined irradiation direction of the illumination light L1 calculated by the position calculator 31 in the detection device 1*a* and the relation between the object OB and a predetermined irradiation direction of the illumination light L1 calculated by the position calculator in the detection device 1*b* are consistent with each other. For example, the model integrator 32 integrates model information by adding the first model information and the coordinate-converted second model information. For example, the model integrator 32 stores the integrated model information in the memory A.

The model integrator 32 may integrate first model information and second model information by matching feature points of the shape represented by the first model information and feature points of the shape represented by the second model information. For example, the model integrator 32 uses the first position information and the second position information, enabling the range for searching for feature points in the second model information similar to feature points in the first model information to be narrowed to reduce the processing load.

For example, the memory 7 is a non-volatile memory such as a USB memory and a memory card, and stores various kinds of information therein. The memory 7 may include a storage device built in the detection device 1*a*, or may include a port to which a storage device that is releasable from the detection device 1*a* is connectable.

For example, the communicator 8 includes at least one of an I/O port, such as a USB port and a LAN port, and a communication device that performs wireless communications using radio waves or infrared rays. The communicator 8 is controlled by the controller 9 to read information stored in the memory 7 and transmit the read information to an external device. For example, the communicator 8 transmits at least a part of calculation results (for example, shape information) of the information calculator 3, calculation results (for example, light source information) of the light source calculator 4, calculation results (for example, surface characteristics information) of the characteristics calculator 5, calculation results (for example, first position information) of the position calculator 31, and processing results of the model integrator 32 to an external device (for example, the information processing device 51 illustrated in FIG. 8 referred to later). For example, the communicator 8 receives information including instructions from the external device. The communicator 8 is capable of storing the received information in the memory 7 and supplying the received information to the controller 9.

For example, the controller 9 controls the components in the detection device 1*a* in response to an instruction (control signal) from a user or an external device. The controller 9 controls the illumination device IL such that the imaging processing by the imager 11 and the detection processing by the detector 2B are executed in synchronization with the irradiation of the illumination light L1. For example, the detection processing includes the imaging processing by the imager 11 and the distance detection processing by the distance measurer 12. For example, the controller 9 stores at least a part of the detection results of the imager 11 in the memory 7. For example, the controller 9 stores at least a part of the detection results of the detector 2B in the memory 7. For example, the controller 9 controls the information calculator 3 to calculate model information (for example, shape information), and stores at least a part of the model information calculated by the information calculator 3 in the memory 7. For example, the controller 9 controls the light source calculator 4 to calculate light source information, and stores at least a part of the light source information calculated by the light source calculator 4 in the memory 7. For example, the controller 9 controls the characteristics calculator 5 to calculate surface characteristics information, and stores at least a part of the surface characteristics information calculated by the characteristics calculator 5 in the memory 7. For example, the controller 9 controls the position calculator 31 to calculate position information, and stores at least a part of the position information calculated by the position calculator 31 in the memory 7. For example, the controller 9 controls the model integrator 32 to execute model integration processing, and stores processing results in the memory 7. For example, the controller 9 controls the communicator 8 to transmit at least a part of the information stored in the memory 7 to an external device.

For example, the detection device 1a is capable of outputting at least a part of the model information to a digital device capable of inputting and outputting digital information such as a barcode and a two-dimensional code. Such a digital device is capable of displaying or printing digital information including at least a part of the model information on a display or paper. A reader device including a reader (for example, an optical reader) capable of reading displayed or printed digital information is capable of inputting the digital information to a storage area in the reader device through the reader. The reader device may further include a rendering processor described later. The above-mentioned detection system 50 may include the digital device or the reader device including the reader described above. The detection device 1a may include the digital device or the reader device described above. When the detection device 1a includes the above-mentioned digital device, the communicator 6 may transmit at least a part of the model information to the above-mentioned digital device. The above-mentioned digital device may generate digital information based on received model information and output the digital information to a medium such as paper.

Figure 4:
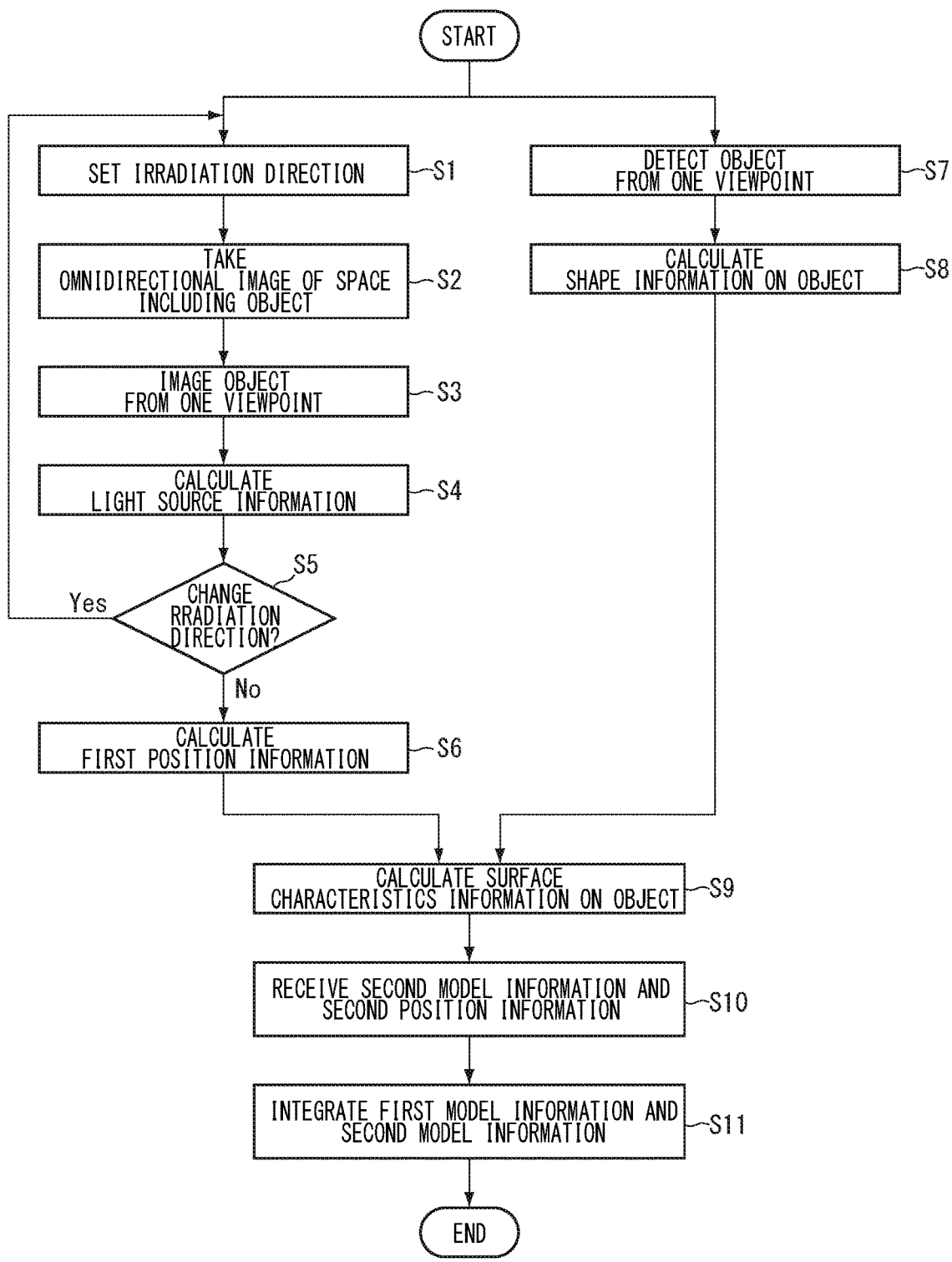
FIG. 4 is a sequence diagram illustrating a detection method according to the first embodiment.

Next, a detection method according to the first embodiment is described based on the operation of the detection device 1a having the above-mentioned configuration. FIG. 4 is a flowchart illustrating an example of the detection method according to the embodiment. The detection device 1 calculates, by using a first taken image obtained by imaging a space including a light source 19 that irradiates an object OB with illumination light L1 and including the object OB, light source information on the light source that irradiates the object OB with the illumination light. For example, while changing the irradiation direction of the illumination light L1, the detection device 1 performs the processing from Step S1 to Step S5 to acquire a first taken image (for example, omnidirectional image) of a space including a light source 19 corresponding to each irradiation direction and including the object OB and a taken image (for example, second taken image) of the object OB viewed from one viewpoint, and calculate a plurality of pieces of light source information corresponding to the irradiation directions. Prior to the processing in Step S1, the imager 2A may take a plurality of omnidirectional images of a space including the object OB in the state in which the irradiation of the illumination light L1 is stopped.

Figure 5:
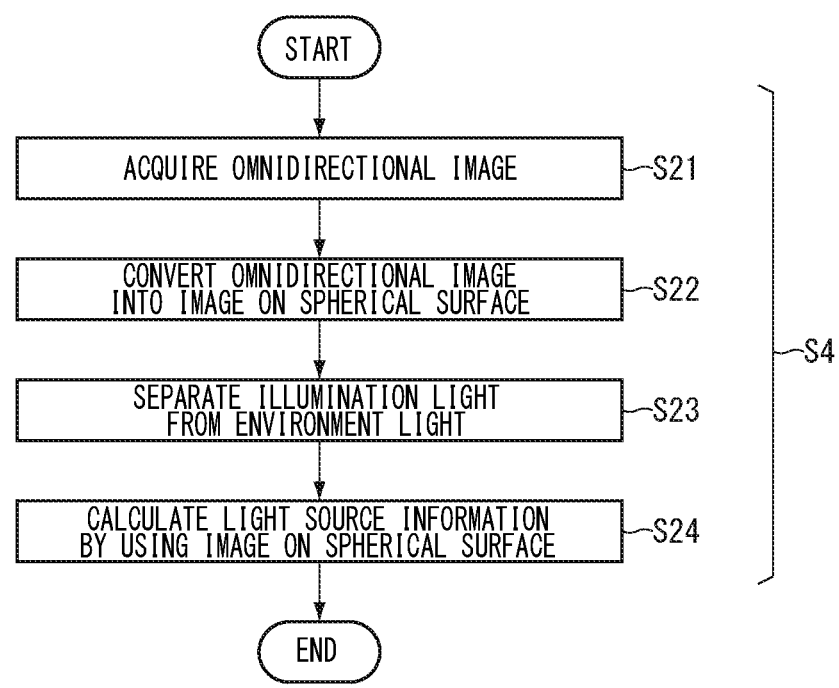
FIG. 5 is a flowchart illustrating an example of imaging processing of first taken images and calculation processing of light source information according to the embodiment.

FIG. 5 is a flowchart illustrating an example of processing for calculating light source information (Step S4 in FIG. 4). In Step S21 in FIG. 5, the light source calculator 4 acquires data on a first taken image (for example, omnidirectional image) from the memory 7. In Step S22, the light source calculator 4 converts the omnidirectional image into an image on a spherical surface (see FIG. 2). In Step S23, the light source calculator 4 separates illumination light L1 from environment light L2 among light (illumination light L1, environment light L2) irradiating the object OB, thereby obtaining light source information on the illumination light L1. For example, the light source calculator 4 subtracts an omnidirectional image taken in the state in which the object OB is not irradiated with the illumination light L1 from an omnidirectional image taken in the state in which the object OB is irradiated with the illumination light L1 to separate the illumination light L1 on the omnidirectional image from the environment light L2. The order of the processing in Step S22 and the processing in Step S23 may be replaced with each other. After the illumination light L1 on the omnidirectional image is separated from the environment light L2, the omnidirectional image may be converted into an image on a spherical surface. In Step S24, the light source calculator 4 calculates light source information on the illumination light L1 at the object OB by using the omnidirectional image on the spherical surface.

In Step S5 in FIG. 4, the controller 9 determines whether to change the irradiation direction of the illumination light L1. For example, when the taking of omnidirectional images in a part of a plurality of predetermined irradiation directions has not been finished, the controller 9 determines to change the irradiation direction of the illumination light L1 (Yes in Step S5). When the controller 9 determines to change the irradiation direction of the illumination light L1 (Yes in Step S5), the controller 9 returns to the processing in Step S1 to set the irradiation direction to the next direction, and repeats the processing after Step S1. In this manner, while the controller 9 switches the irradiation direction of the illumination light L1, the imager 2A takes an omnidirectional image for each irradiation direction, and the light source calculator 4 calculates light source information for each irradiation direction. The processing (light source information calculation processing) in Step S4 may be performed after an omnidirectional image is acquired for each of a plurality of irradiation directions. For example, the detection device 1 may repeat the processing from Step S1 to Step S5 excluding the processing in Step S4 to accumulate data on omnidirectional images, and the light source calculator 4 may use the accumulated data on omnidirectional images to sequentially calculate light source information on irradiation directions.

In Step S5, for example, when the taking of omnidirectional images in predetermined irradiation directions has been finished, the controller 9 determines not to change the irradiation direction of the illumination light L1 (No in Step S5). When the controller 9 determines not to change the irradiation direction of the illumination light L1 (No in Step S5), the position calculator 31 uses the light source information to calculate position information (first position information) in Step S6.

In Step S7, the detector 2B detects the object OB from a viewpoint Vp1. For example, the controller 9 controls the imager 11 to execute imaging processing in parallel to (in synchronization with) the imaging by the imager 2A. The controller 9 controls the distance measurer 12 to detect a distance to the object OB. The detection processing of the distance by the distance measurer 12 may or need not be performed in parallel to the imaging processing by the imager 2A or the imaging processing by the imager 11. In Step S8, the information calculator 3 uses the detection results of the detector 2 to calculate shape information on the object OB viewed from the viewpoint Vp1. For example, the information calculator 3 uses the detection results (for example, depth information) of the distance measurer 12 to calculate point cloud data, and uses the point cloud data to calculate surface information.

In Step S9, the characteristics calculator 5 calculates surface characteristics information on the object OB by using the shape information calculated by the information calculator 3, the light source information calculated by the light source calculator 4, and a plurality of taken images obtained by imaging the object OB while changing the irradiation direction. For example, the taken images are images taken by the imager 11 in Step S2, but may be an omnidirectional image taken by the imager 2A in Step S1, and may include an image taken by the imager 2A and an image taken by the imager 11.

Figure 6:
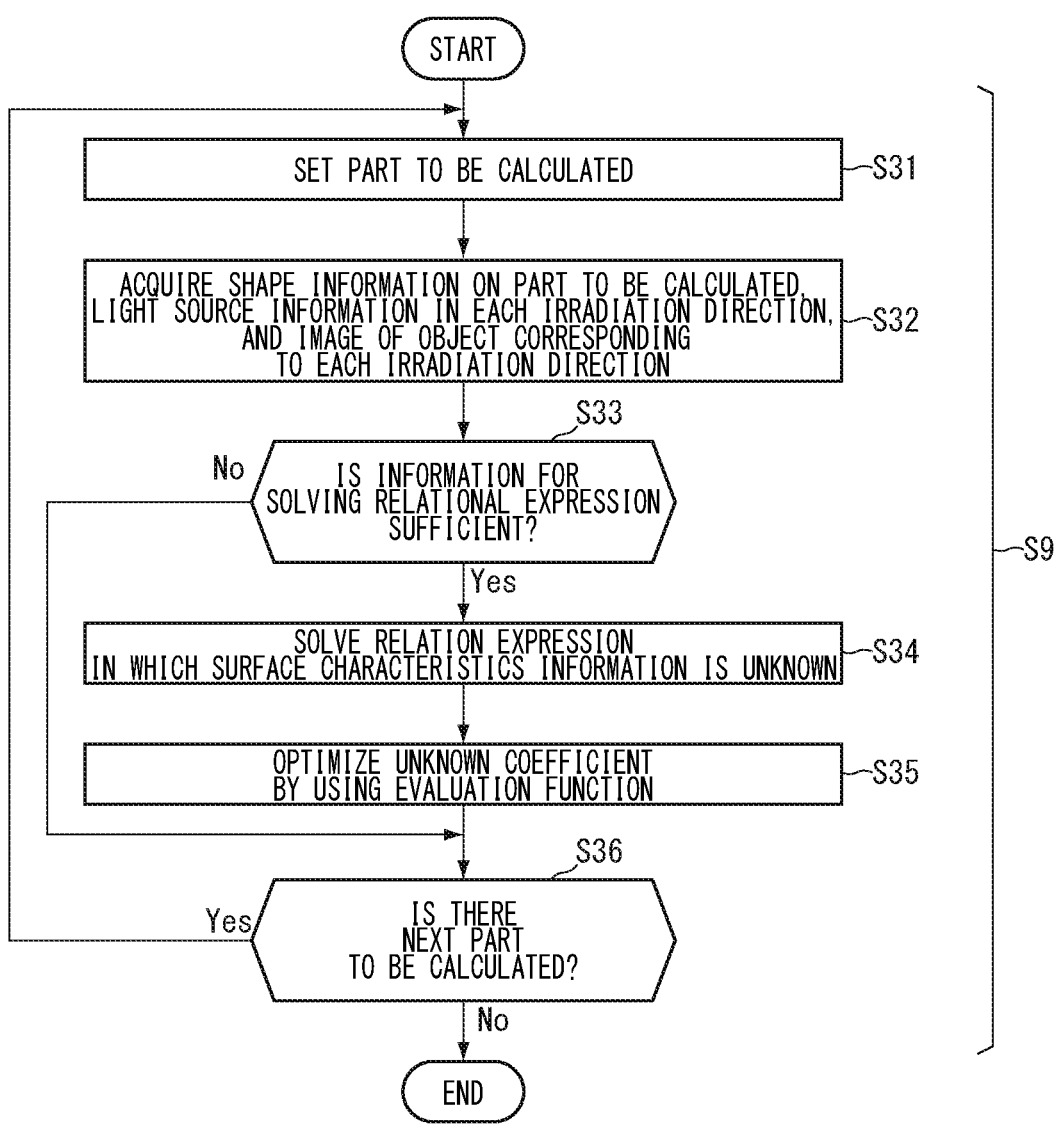
FIG. 6 is a flowchart illustrating an example of processing for calculating surface characteristics information according to the embodiment.

FIG. 6 is a flowchart illustrating an example of processing for calculating surface characteristics information according to the embodiment (Step S9). In Step S31, the characteristics calculator 5 sets a part to be calculated of the object OB. For example, the part to be calculated may be one pixel or a plurality of pixels in a taken image, may be a mesh region surrounded by a line sequentially connecting three or more points included in point cloud data, or may be a surface surrounded by three or more lines included in surface information. In Step S32, the characteristics calculator 5 acquires shape information on the part to be calculated, light source information on irradiation directions of the illumination light L1, and taken images (for example, images taken by the imager 11) of the object OB corresponding to the irradiation directions from the memory 7.

In Step 33, the characteristics calculator 5 determines whether information for solving a relational expression (for example, Expression (4) above) is sufficient. For example, as described above for Expression (4), when the number of observation pixels is equal to or more than the number of basis vectors, the characteristics calculator 5 determines that information for solving the relational expression is sufficient (Yes in Step S33). When the characteristics calculator 5 determines that information for solving the relational expression is sufficient (Yes in Step S33), the characteristics calculator 5 solves a relational expression in which surface characteristics information is unknown in Step S34. In Step S35, the characteristics calculator 5 optimizes the unknown by using an evaluation function. For example, the evaluation function is a difference between an image of the object OB obtained by rendering processing using the solution of the above-mentioned relational expression and a taken image used to solve the relational expression. For example, the characteristics calculator 5 optimizes the unknown such that the value of the above-mentioned evaluation function is minimized.

When it is determined in Step S33 that information for solving the relational expression is not sufficient (insufficient) (No in Step S33) or after the processing in Step S35, the characteristics calculator 5 determines whether there is the next part to be calculated in Step S36. For example, the characteristics calculator 5 determines that there is the next part to be calculated when the processing in Step S31 is not completed for a predetermined part (Yes in Step S36). When the characteristics calculator 5 determines that there is the next part to be calculated (Yes in Step S36), the characteristics calculator 5 returns to the processing in Step S31 to set the next part to be calculated, and repeats the processing in and after Step S32. In Step S36, for example, when the processing in Step S31 has been completed for a predetermined part, the characteristics calculator 5 determines that there is no next part to be calculated (No in Step S36), and finishes a series of processing.

Figure 7:
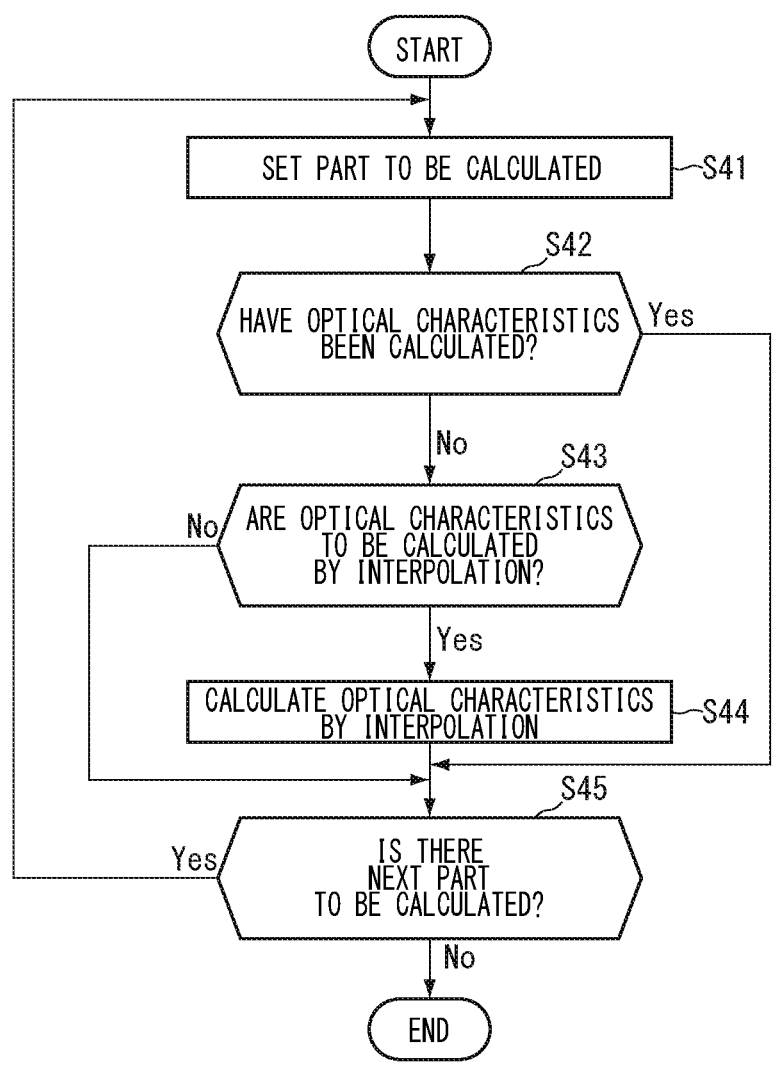
FIG. 7 is a flowchart illustrating another example of the processing for calculating surface characteristics information according to the embodiment.

FIG. 7 is a flowchart illustrating another example of the processing for calculating surface characteristics information according to the embodiment. In the processing in FIG. 7, the characteristics calculator 5 calculates optical characteristics of other parts by interpolation using optical characteristics obtained by solving the above-mentioned relational expression. For example, the processing in FIG. 7 is performed after the processing in Step S36 in FIG. 6. In Step S41, the characteristics calculator 5 sets a part to be calculated. In Step S42, the characteristics calculator 5 determines whether optical characteristics of the part to be calculated have been calculated. When the characteristics calculator 5 determines that the optical characteristics of the part to be calculated have not been calculated (No in Step S42), the characteristics calculator 5 determines whether to calculate the optical characteristics by interpolation. For example, the characteristics calculator 5 determines to calculate the optical characteristics by interpolation when the required number of parts, whose optical characteristics have been calculated, for interpolation is present around the part to be calculated (Yes in Step S43). When the characteristics calculator 5 determines to calculate the optical characteristics by interpolation (Yes in Step S43), the characteristics calculator 5 calculates the optical characteristics by interpolation in Step S44.

After the processing in Step S44, when the characteristics calculator 5 determines that the optical characteristics have been calculated in Step S32 (No in Step S42) or when the characteristics calculator 5 determines in Step S43 not to calculate the optical characteristics by interpolation (No in Step S43), the characteristics calculator 5 determines in Step S45 whether there is the next part to be calculated. For example, the characteristics calculator 5 determines that there is the next part to be calculated when the processing in Step S41 has not been completed for a predetermined part (Yes in Step S45). When the characteristics calculator 5 determines that there is the next part to be calculated (Yes in Step S45), the characteristics calculator 5 returns to the processing in Step S41 to set the next part to be calculated, and repeats the processing in and after Step S42. In Step S45, for example, when the processing in Step S41 has been completed for a predetermined part, the characteristics calculator 5 determines that there is no next part to be calculated (No in Step S45), and finishes a series of processing.

As described above, for example, the detection device 1a in the first embodiment may include: a detector that detects an object from a first viewpoint (for example, one viewpoint); an information calculator that calculates first model information including shape information on the object from the first viewpoint by using detection results of the detector; a light source calculator that calculates light source information on the illumination light by using a plurality of omnidirectional images obtained by imaging a space including the object while changing an irradiation direction of illumination light with respect to the object; and a position calculator that calculates relative positions between the viewpoints by using the light source information as information used to integrate the first model information and second model information including shape information obtained by detecting the object from a viewpoint (for example, second viewpoint) different from the first viewpoint. In this manner, according to the first embodiment, for example, the position of a light source that irradiates an object with illumination light is able to be estimated from an omnidirectional image, and a relative position between detection devices is able to be specified by using a plurality of omnidirectional images.

Second Embodiment

Figure 8:
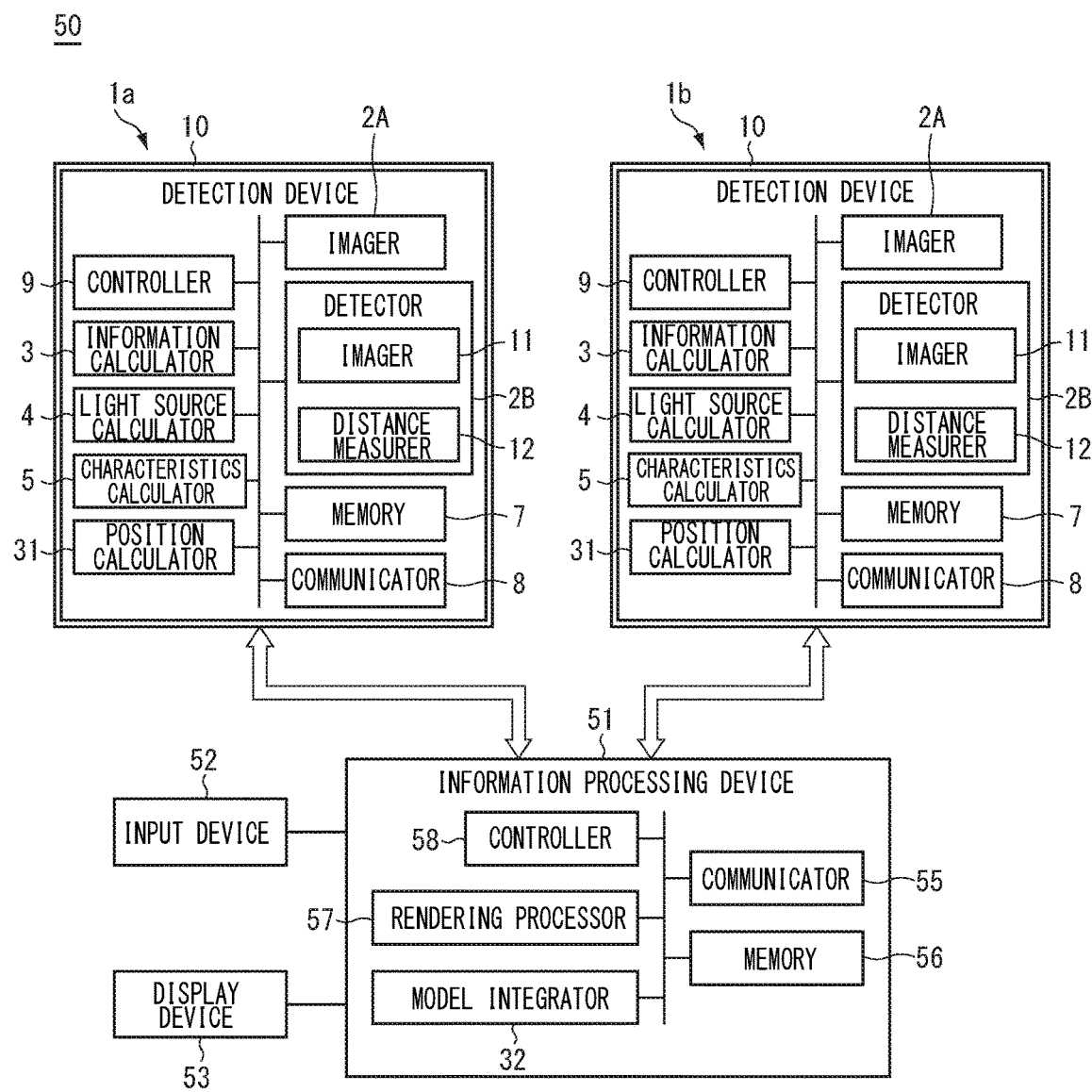
FIG. 8 is a diagram illustrating a detection device and a detection system according to a second embodiment.

A second embodiment is described. In the second embodiment, the same configurations as in the above-mentioned embodiment are denoted by the same reference symbols, and descriptions thereof are omitted or simplified. FIG. 8 is a diagram illustrating a detection device and a detection system according to the embodiment. The detection system A includes an information processing device A that processes at least one of information output from the imaging device 1a and information output from the imaging device 1b. For example, the information processing device 51 is provided with an input device 52 and a display device 53.

The information processing device 51 acquires information from the detection device 1a through communications with the detection device 1a. The information processing device 51 acquires information from the detection device 1b through communications with the detection device 1b. For example, the information processing device 51 executes the rendering processing by using at least a part of the information acquired from the detection device 1a and the information acquired from the detection device 1b. For example, on the basis of setting information on a viewpoint input to the input device 52 by the user, the information processing device 51 calculates data on an estimated image obtained by viewing the object OB from this viewpoint. For example, the information processing device 51 supplies the data on the estimated image to the display device 53 and displays the estimated image on the display device 53.

The input device 52 includes, for example, at least one of a keyboard, a mouse, a touch panel, a sensor such as an acceleration sensor, a voice input machine, and a touch pen. The input device 52 is connected to the information processing device 51. For example, the input device 52 receives input of information from the user and supplies the input information to the information processing device 51. The display device 53 includes, for example, a liquid crystal display or a touch panel display and is connected to the information processing device 51. For example, the display device 53 displays an image (for example, an estimated image by the rendering processing) by using image data supplied from the information processing device 51.

The information processing device 51 includes a communicator 55, a memory 56, a model integrator 32, a rendering processor 57, and a controller 58. For example, the communicator 55 includes at least one of a USB port, a network card, or a communication device that performs wireless communications using radio waves or infrared rays. The communicator 55 is communicable with the communicator 8 in the detection device 1a and the communicator 8 in the detection device 1b.

For example, the memory 56 includes a removable storage medium such as a USB memory, or an external or built-in large-capacity storage device such as a hard disk. For example, the memory 56 stores therein data on at least a part of the information received via the communicator 55, an imaging control program for controlling at least one of the detection device 1a and the detection device 1b, and a processing program for executing each processing in the information processing device 51.

The model integrator 32 is the same as in first embodiment. For example, the information processing device 51 receives first model information and first position information from the detection device 1a, and receives second model information and second position information from the detection device 1b. The model integrator 32 uses the first position information and the second position information to integrate the first model information and the second model information. The detection device 1a may or need not include the model integrator 32.

The rendering processor 57 includes, for example, a graphics processing unit (GPU). The rendering processor 57 may have an aspect in which a CPU and a memory execute each processing in accordance with an image processing program. For example, the rendering processor 57 executes at least one of drawing processing, texture mapping processing, or shading processing.

In the drawing processing, for example, the rendering processor 57 is able to calculate an estimated image (for example, reconstructed image) of a shape determined by shape information in model information as viewed from a certain viewpoint. In the following description, the shape represented by the shape information is referred to as "model shape". In the drawing processing, for example, the rendering processor 57 is able to reconstruct a model shape (for example, estimated image) from model information (for example, shape information). The rendering processor 57 performs rendering processing by using surface characteristics information included in the model information obtained by integrating the first model information and the second model information. For example, the rendering processor 57 stores data on the calculated estimated image in the memory 56. In the texture mapping processing, for example, the rendering processor 57 is able to calculate an estimated image obtained by attaching an image represented by texture information in model information to the surface of an object on the estimated image. The rendering processor 57 is also able to calculate an estimated image obtained by attaching a texture different from the object OB to the surface of the object on the estimated image. In the shading processing, for example, the rendering processor 57 is able to calculate an estimated image obtained by adding a shade formed by a light source represented by light source information in model information to an object on the estimated image. In the shading processing, for example, the rendering processor 57 is able to calculate an estimated image obtained by adding a shade formed by a desired light source to an object on the estimated image.

For example, the controller 58 controls the components in the information processing device 51, the detection device 1a, the detection device 1b, the illumination device IL, the input device 52, and the display device 53. For example, the controller 58 controls the communicator 55 to transmit an instruction (a control signal) and setting information to the detection device 1a and the detection device 1b. For example, the controller 58 stores information received by the communicator 55 from the detection device 1a and the detection device 1b in the memory 56. For example, the controller 58 controls the rendering processor 57 to execute the rendering processing.

The detection system 50 does not necessarily include the input device 52. For example, various kinds of instructions and information may be input to the detection system 50 via the communicator 8. The detection system 50 does not necessarily include the display device 53. For example, the detection system 50 may output the data on the estimated image generated by the rendering processing to an external display device, and this display device may display the estimated image.

In the above-mentioned embodiments, a calculator including the information calculator 3, the light source calculator 4, and the position calculator 31 includes a computer system, for example. For example, this calculator reads a detection program stored in the memory 7, and executes various kinds of processing in accordance with the detection program. For example, the detection program causes a computer to execute: calculating, by using detection results of detecting an object from a first viewpoint, first model information including shape information on the object from the first viewpoint; calculating, by using a plurality of first taken images obtained by imaging a space including a light source that irradiates the object with illumination light (for example, the illumination light L1) and including the object, light source information on the light source; and calculating an absolute or relative positional relation between the first viewpoint and the object by using the light source information as information used to integrate the first model information and second model information including shape information obtained by detecting the object from a second viewpoint different from the first viewpoint. The detection program may be recorded in a computer-readable storage medium to be provided.

The technical scope of the present invention is not limited to the modes described in the above-mentioned embodiments and the like. At least one of the elements described in the above-mentioned embodiments and the like may be omitted. The elements described in the above-mentioned embodiments and the like may be combined as appropriate. To the extent allowed by laws, the disclosure of all the literature cited in the above-mentioned embodiments and the like is incorporated herein by reference.

DESCRIPTION OF REFERENCE SIGNS

1*a*, 1*b* detection device, 2A imager, 2B detector, 3 information calculator, 4 light source calculator, 5 characteristics calculator, 8 communicator, 9 controller, 11 imager, 12 distance measurer, 31 position calculator, 32 model integrator, 50 detection system, IL illumination device, L1 illumination light, L2 environment light, OB object, Vp1 viewpoint, Vp2 viewpoint

What is claimed is:

1. A detection device, comprising:
a detector that detects an object from a first viewpoint;
an information calculator that calculates first model information including shape information on the object from the first viewpoint by using detection results of the detector;
a light source calculator that calculates light source information on a light source that irradiates the object with illumination light by using a first taken image obtained by imaging a space including the light source and the object, wherein the space has at least a hemispherical range centered at the first viewpoint;
a position calculator that calculates a positional relation between the first viewpoint and the object by using the light source information as information used to integrate the first model information and second model information including shape information obtained by detecting the object from a second viewpoint different from the first viewpoint, wherein
the light source information includes information on at least one of (i) the position of the light source that irradiates the object with the illumination light with reference to the object, (ii) an irradiation direction in which the light source irradiates the object with the illumination light, (iii) a wavelength of the illumination light emitted from the light source, and (iv) a type of the light source; and
a model integrator that integrates the first model information and the second model information, to correlate the positional relation between the first viewpoint and the object calculated by the position calculator and a positional relation between the second viewpoint and the object, by converting a coordinate system of the second model information into a coordinate system of the first model information and then adding the coordinate-converted second model information to the first model information.

2. The detection device according to claim 1, wherein the position calculator calculates the positional relation between the first viewpoint and the object by using the irradiation direction of the illumination light with respect to the object as the light source information.

3. The detection device according to claim 2, comprising a characteristics calculator that calculates surface characteristics information on the illumination light with respect to the object to calculate the irradiation direction of the illumination light.

4. The detection device according to claim 1, wherein the light source calculator separates the illumination light from environment light to calculate the light source information with respect to the object.

5. The detection device according to claim 4, wherein the light source calculator calculates the light source information by comparing the first taken image in a state in which the object is irradiated with the illumination light and the first taken image in a state in which the object is not irradiated with the illumination light.

6. The detection device according to claim 1, comprising a communicator that transmits at least one of the first taken image and an image in which an influence of the illumination light is reduced from the first taken image to outside.

7. The detection device according to claim 1, wherein the first taken image includes an omnidirectional image of the space including the light source and the object.

8. The detection device according to claim 1, comprising a first imager that takes the first taken image.

9. The detection device according to claim 8, wherein
the detector includes a second imager that images the object, and
the first imager has an imaging range wider than an imaging range of the second imager.

10. The detection device according to claim 1, comprising a controller that supplies a control signal to the illumination device.

11. The detection device according to claim 1, comprising:
a communicator that receives the second model information and the positional relation between the second viewpoint and the object.

12. A detection system, comprising:
a first detection device that is the detection device according to claim 1; and a second detection device that detects the object from the second viewpoint to calculate the second model information including the shape information on the object, transmits second position information representing a relation between the irradiation direction of the illumination light and a position of the object and a position of the second viewpoint, and transmits the second model information.

13. The detection system according to claim 12, comprising an information processing device that processes at least one of information output from the first detection device and information output from the second detection device.

14. A detection system, comprising:
   the detection device according to claim 1; and
   an information processing device that processes information output from the detection device.

15. A detection method, comprising:
   detecting an object from a first viewpoint;
   calculating first model information including shape information on the object from the first viewpoint by using detection results in the detecting;
   calculating, by using a first taken image obtained by imaging a space including a light source that irradiates the object with illumination light and including the object, light source information on the light source, wherein the space has at least a hemispherical range centered at the first viewpoint;
   calculating a positional relation between the first viewpoint and the object by using the light source information as information used to integrate the first model information and second model information including shape information obtained by detecting the object from a second viewpoint different from the first viewpoint, wherein
   the light source information includes information on at least one of (i) the position of the light source that irradiates the object with the illumination light with reference to the object, (ii) an irradiation direction in which the light source irradiates the object with the illumination light, (iii) a wavelength of the illumination light emitted from the light source, and (iv) a type of the light source; and
   integrating the first model information and the second model information, to correlate the positional relation between the first viewpoint and the object and a positional relation between the second viewpoint and the object, by converting a coordinate system of the second model information into a coordinate system of the first model information and then adding the coordinate-converted second model information to the first model information.

16. A non-transitory computer-readable storage medium storing therein a detection program causing a computer to execute:
   calculating, by using detection results of detecting an object from a first viewpoint, first model information including shape information on the object from the first viewpoint;
   calculating, by using a first taken image obtained by imaging a space including a light source that irradiates the object with illumination light and including the object, light source information on the light source, wherein the space has at least a hemispherical range centered at the first viewpoint;
   calculating a positional relation between the first viewpoint and the object by using the light source information as information used to integrate the first model information and second model information including shape information obtained by detecting the object from a second viewpoint different from the first viewpoint, wherein
   the light source information includes information on at least one of (i) the position of the light source that irradiates the object with the illumination light with reference to the object, (ii) an irradiation direction in which the light source irradiates the object with the illumination light, (iii) a wavelength of the illumination light emitted from the light source, and (iv) a type of the light source; and
   integrating the first model information and the second model information, to correlate the positional relation between the first viewpoint and the object and a positional relation between the second viewpoint and the object, by converting a coordinate system of the second model information into a coordinate system of the first model information and then adding the coordinate-converted second model information to the first model information.

17. A detection device, comprising:
   a detector that detects an object from a first viewpoint;
   an information calculator that calculates first model information including shape information on the object from the first viewpoint by using detection results of the detector;
   a light source calculator that calculates light source information on a light source that irradiates the object with illumination light;
   a position calculator that calculates a positional relation between the first viewpoint and the object or the light source and a positional relation between a second viewpoint different from the first viewpoint, and the object or the light source, or a positional relation between the first viewpoint and the second viewpoint, by using the light source information as information used to integrate the first model information and second model information including shape information obtained by detecting the object from the second viewpoint; and
   a model integrator that integrates the first model information and the second model information by converting a coordinate system of the second model information into a coordinate system of the first model information and then adding the coordinate-converted second model information to the first model information.

18. The detection device according to claim 17, wherein the light source information includes an irradiation direction of the illumination light with respect to the object, and
   the position calculator calculates the positional relation by using the irradiation direction of the illumination light.

19. A detection device, comprising:
   a first detector that detects an object from a first viewpoint;
   a second detector that detects the object from a second viewpoint;
   an information calculator that calculates first model information including shape information on the object from the first viewpoint and second model information including shape information on the object from the second viewpoint by using detection results of the first detector and the second detector;
   a light source calculator that calculates first light source information on a first light source that irradiates the object with illumination light, and that calculates second light source information on a second light source that irradiates the object with illumination light;

a position calculator that calculates a first relation between the first light source and the first viewpoint and a second relation between the second light source and the second viewpoint; and a model integrator that integrates the first model information and the second model information, to correlate the first light source information and the second light source information, by converting a coordinate system of the second model information into a coordinate system of the first model information and then adding the coordinate-converted second model information to the first model information.

* * * * *